United States Patent
Kang et al.

(10) Patent No.: US 7,756,352 B2
(45) Date of Patent: Jul. 13, 2010

(54) APPARATUS AND METHOD FOR DATA PROCESSING BY USING PLURALITY OF DATA PROCESSING APPARATUSES AND RECORDING MEDIUM STORING PROGRAM FOR EXECUTING THE METHOD

(75) Inventors: Hyun Kang, Suwon-si (KR); Sung-hee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1092 days.

(21) Appl. No.: 11/267,297

(22) Filed: Nov. 7, 2005

(65) Prior Publication Data
US 2006/0140499 A1 Jun. 29, 2006

(30) Foreign Application Priority Data
Dec. 29, 2004 (KR) .................. 10-2004-0115036

(51) Int. Cl.
*G06K 9/40* (2006.01)
*G10L 11/00* (2006.01)

(52) U.S. Cl. ............... 382/254; 704/200; 348/E5.077; 386/E5.002

(58) Field of Classification Search .......... 382/254; 704/200
See application file for complete search history.

(56) References Cited

U.S. PATENT DOCUMENTS 5,864,681 A * 1/1999 Proctor et al. .......... 709/247

2001/0019365 A1* 9/2001 Kim et al. ............. 348/554
2002/0089427 A1* 7/2002 Aratani et al. ....... 340/825.72
2004/0047298 A1* 3/2004 Yook et al. ............ 370/254
2005/0102699 A1* 5/2005 Kim et al. ............. 725/81

FOREIGN PATENT DOCUMENTS

| KR | 1998-030715 A | 7/1998 |
|---|---|---|
| KR | 1999-0006690 A | 1/1999 |
| KR | 10-2001-0087018 A | 9/2001 |
| KR | 10-2002-0015862 A | 3/2002 |
| KR | 2002-0058063 A | 7/2002 |

* cited by examiner

*Primary Examiner*—Bhavesh M Mehta
*Assistant Examiner*—Stephen R Koziol
(74) *Attorney, Agent, or Firm*—Sughrue Mion, PLLC (57) ABSTRACT

A data processing method is provided in which a plurality of data processing apparatuses share their attribute information such that an optimum data processing apparatus or an optimum combination of data processing apparatuses can optimally process input data. The method includes receiving attribute information of at least one of the data processing apparatuses, determining a data processing condition for processing input data based on the information, and transmitting the data processing condition to the at least one of the data processing apparatuses. Therefore, when the method is used, redundant processing of input data by data processing apparatuses having the same function can be prevented. At the same time, data processing can be carried out in an optimum condition.

53 Claims, 7 Drawing Sheets

| LOOKUP TABLE | | |
|---|---|---|
| | 0 | PRODUCT INFORMATION (YEAR OF MANUFACTURE, PRODUCT NAME,...) |
| | 1 | CONTRAST CONTROL |
| | 2 | DETAIL CONTROL |
| | 3 | BRIGHTNESS CONTROL |
| | 4 | COLOR CONTROL |
| | 5 | NOISE ELIMINATION CONTROL |
| | 6 | SCALE CONVERSION CONTROL |
| | 7 | FORMAT CONVERSION CONTROL |
| | 8 | . |
| | 9 | . |
| | a | . |
| | b | . |
| | c | . |
| | d | . |
| | e | . |
| | f | . |

APPARATUS AND METHOD FOR DATA PROCESSING BY USING PLURALITY OF DATA PROCESSING APPARATUSES AND RECORDING MEDIUM STORING PROGRAM FOR EXECUTING THE METHOD

This application claims priority from Korean Patent Application No. 10-2004-0115036, filed on Dec. 29, 2004, in the Korean Intellectual Property Office, the disclosure of which is incorporated herein in its entirety by reference.

BACKGROUND OF THE INVENTION

1. Field of the Invention

Apparatuses and methods consistent with the present invention relate to data processing using a plurality of data processing apparatuses, and more particularly, to data processing which enables input data to be processed in an optimum data processing environment by making data processing apparatuses share information.

2. Description of the Related Art

Figure 1:
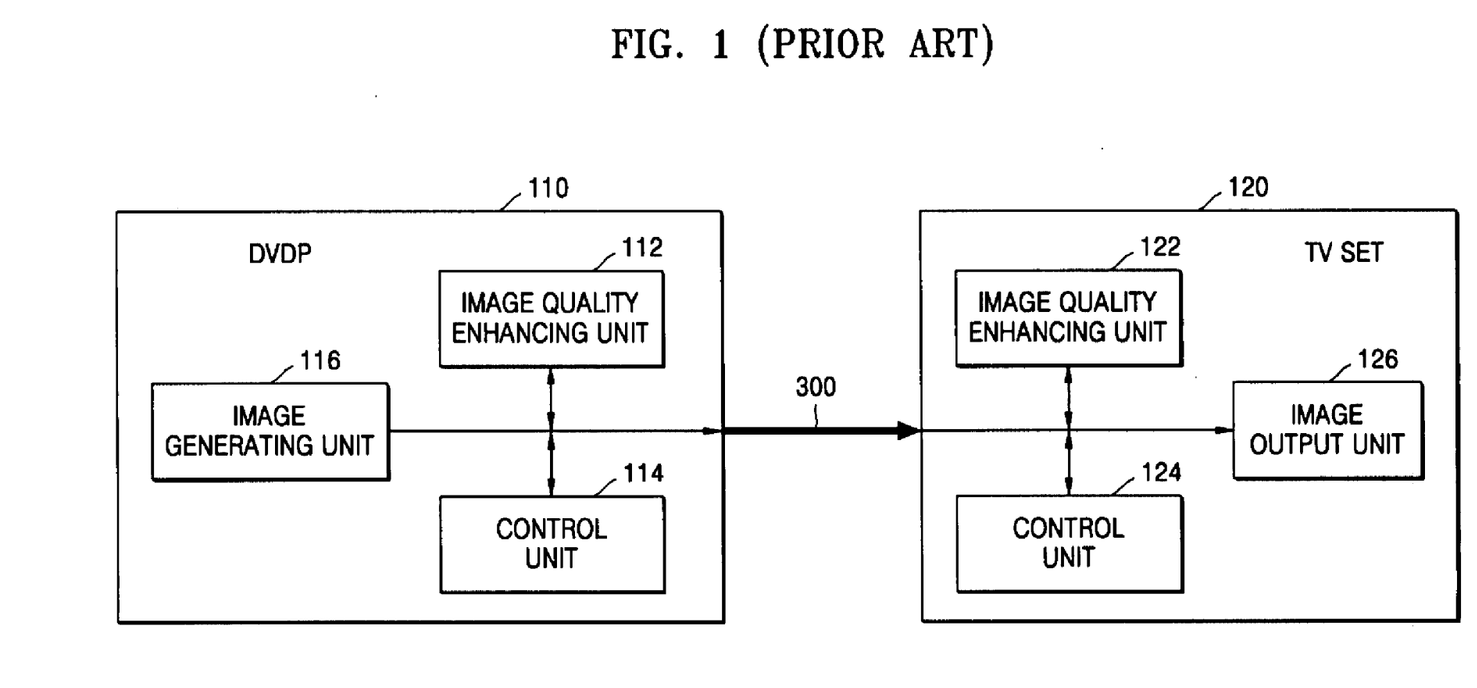
FIG. 1 is a block diagram of conventional image processing apparatuses for enhancing image quality.

FIG. 1 is a block diagram for explaining a conventional image processing method for enhancing image quality between image processing apparatuses. Referring to FIG. 1, a host device 110, for example, a digital versatile disk player (DVDP), includes an image quality enhancing unit 112, a control unit 114 and an image generating unit 116, and a display device 120 includes an image quality enhancing unit 122, a control unit 124 and an image output unit 126. The host device 110 and the display device 120 are connected to each other by an image interface 300.

Controlled by the control unit 114, the image quality enhancing unit 112 enhances image quality of an image signal generated by the image generating unit 116 of the host device 110 and outputs the image signal with enhanced image quality. The image signal output from the host device 110 is input to the display device 120 via the image interface 300. Once the image signal is input to the display device 120, the control unit 124 controls the image signal. Controlled by the control unit 124, the image quality enhancing unit 122 enhances the image quality of the image signal and outputs the image signal with enhanced image quality to the image output unit 126.

As described above, conventional image devices do not share information regarding the processing of image quality of an image signal input to or output from the image devices. Therefore, even though the image quality of the image signal is enhanced by the image-enhancing unit 112 of the host device 110, the image signal is processed again by the image quality enhancing unit 122 of the display device 120 to enhance image quality. Consequently, the process of enhancing image quality is redundantly performed or an optimized enhancement of image quality is not effectively performed to a desired level.

For example, after the image quality enhancing unit 112 of the host device 110 low-pass filters input data to eliminate noise contained in the input data, if the image-quality enhancing unit 122 of the display device 120 low-pass filters the input data again, the input data may be distorted.

SUMMARY OF THE INVENTION

The present invention provides a data processing method in which a plurality of data processing apparatuses are made to share their attribute information for effective data processing.

According to an aspect of the present invention, there is provided a data processing method using a plurality of data processing apparatuses. The method includes: receiving attribute information of at least one of the data processing apparatuses; determining a data processing condition for processing input data based on the attribute information; and transmitting the data processing condition to the at least one of the data processing apparatuses.

The input data may be image data and the data processing apparatuses may be image quality enhancing units which enhance image quality of the image data.

The input data may be audio data, and the data processing apparatuses may be audio processing units enhancing audio quality of the audio data.

The data processing apparatuses may exchange their attribute information and data processing conditions via a bi-directional interface.

The attribute information of the at least one of the data processing apparatuses may include at least one of a manufacturer, a year of manufacture, and a product version of the at least one of the data processing apparatuses.

The attribute information of the at least one of the data processing apparatuses may include information regarding at least one of contrast enhancement, detail enhancement, brightness enhancement, color enhancement, noise elimination, scale conversion, and format conversion.

The attribute information of the at least one of the data processing apparatuses may include at least one of information regarding an algorithm used for data processing and information regarding parameters set in the algorithm.

The determining of the data processing condition may include selecting one of the at least one of the data processing apparatuses to process the input data based on the attribute information of the at least one of the data processing apparatuses, and the determined data processing condition comprises information indicating a data processing apparatus to process the input data.

The determining of the data processing condition may include selecting at least one of the at least one of the data processing apparatuses to process the input data based on the attribute information of the at least one of the data processing apparatuses, and the determined data processing condition comprises information indicating that the selected at least one of the data processing apparatuses is to process the input data or information indicating a data processing function of each of the data processing apparatuses.

The attribute information of the at least one of the data processing apparatuses may include at least one of a year of manufacture and a product version of the at least one of the data processing apparatuses, and the determining of the data processing condition may further include determining a newest one of the at least one of the data processing apparatuses as an apparatus for processing the input data and determining not to perform data processing at the remaining data processing apparatuses.

The attribute information of the at least one of the data processing apparatuses may include at least one of a year of manufacture and a product version of the at least one of the data processing apparatuses, and the determining of the data processing condition may include determining a newest one of the at least one of the data processing apparatuses as an apparatus for processing the input data and determining to perform data processing with the remaining data processing apparatuses using set default values.

According to another aspect of the present invention, there is provided an apparatus for processing input data using a plurality of data processing apparatuses. The apparatus comprises: an input unit which receives attribute information of at least one of the data processing apparatuses; a determining unit which determines a data processing condition for processing the input data based on the information; and a transmitting unit which transmits the determined data processing condition to the at least one of the data processing apparatuses.

According to another aspect of the present invention, there is provided a data processing method using a plurality of data processing apparatuses, one of which is a master apparatus. The method comprises: transmitting attribute information of a current data processing apparatus, among the plurality of data processing apparatuses, to the master apparatus; receiving data processing condition information determined according to attribute information of at least one of the data processing apparatuses from the master apparatus; and processing input data based on the data processing condition.

According to another aspect of the present invention, there is provided an apparatus for processing input data in association with a plurality of data processing apparatuses, one of which is a master apparatus. The apparatus comprises: a transmitting unit which transmits attribute information of the data processing apparatus to the master apparatus; an input unit which receives data processing condition information determined according to attribute information of at least one of the data processing apparatuses from the master apparatus; and a data processing unit which processes the input data based on the data processing condition.

According to another aspect of the present invention, there is provided a computer-readable recording medium storing a program for executing a data processing method using a plurality of data processing apparatuses, the method comprising: receiving attribute information of at least one of the data processing apparatuses; determining a data processing condition for processing input data based on the information; and transmitting the determined data processing condition to the at least one of the data processing apparatuses.

According to another aspect of the present invention, there is provided a computer-readable recording medium storing a program for executing a data processing method using a plurality of data processing apparatuses, one of which is a master apparatus, the method comprising: transmitting attribute information of a current data processing apparatus, among the plurality of data processing apparatuses, to the master apparatus; receiving data processing condition information determined according to attribute information of at least one of the data processing apparatuses from the master apparatus; and processing input data based on the data processing condition.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the exemplary embodiments set forth therein. Rather, these exemplary embodiments are provided so that this disclosure will be thorough and complete, and will fully convey the concept of the invention to those skilled in the art.

Figure 2:
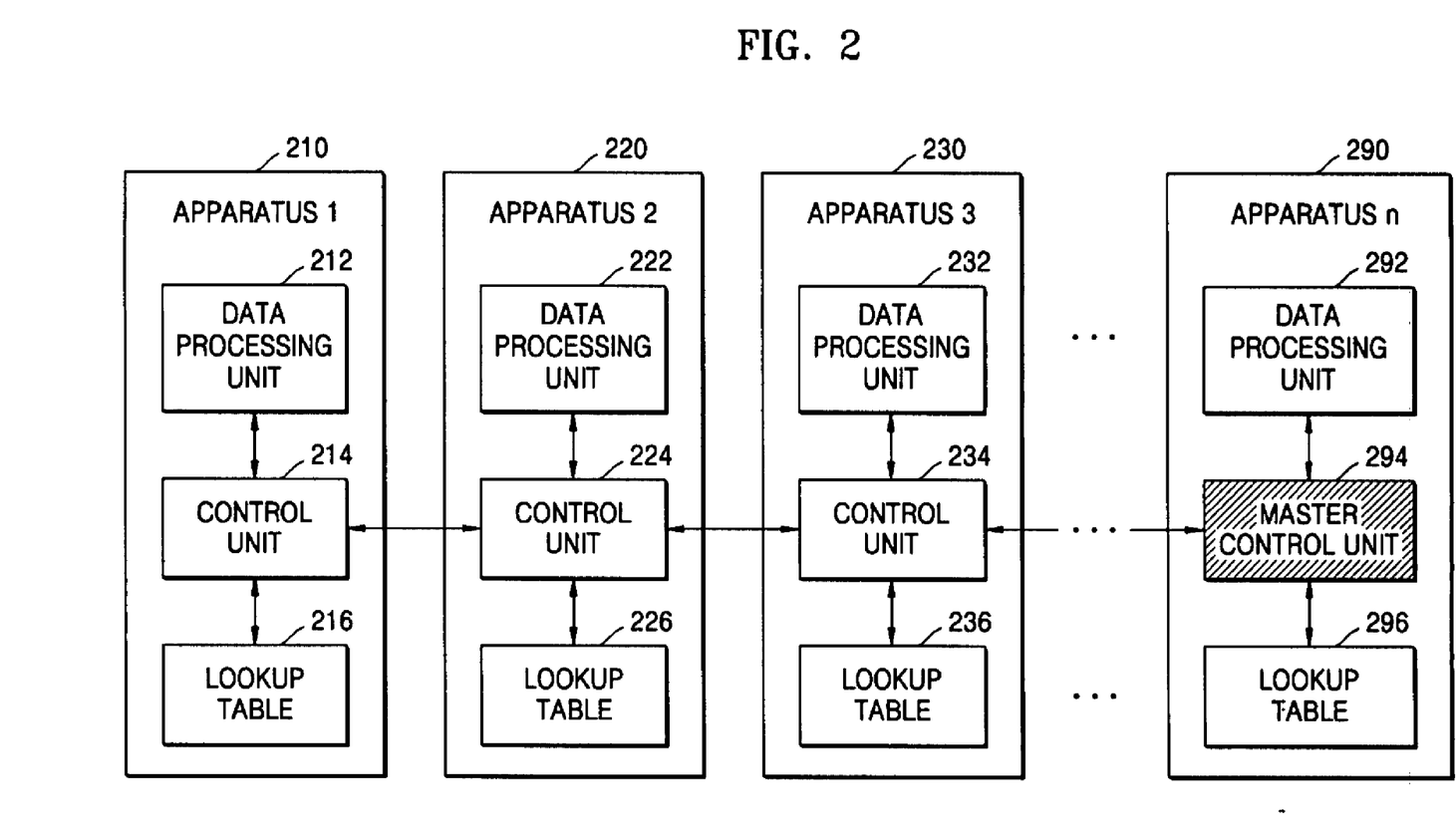
FIG. 2 is a block diagram of a plurality of data processing apparatuses for illustrating a method of processing data using the data processing apparatuses according to an exemplary embodiment of the present invention.

FIG. 2 is a block diagram of first through $n^{th}$ data processing apparatuses 210, 220, 230, . . . 290 for illustrating a method of processing data using the first through $n^{th}$ data processing apparatuses 210, 220, 230, . . . 290 according to an exemplary embodiment of the present invention. Referring to FIG. 2, the first through $n^{th}$ data processing apparatuses 210, 220, 230, . . . 290 include n data processing units 212, 222, 232, . . . 292, n control units 214, 224, 234, . . . 294, and n lookup tables 216, 226, 236, . . . 296, respectively, and n−1 bi-directional interface means transmit data among the first through $n^{th}$ data processing apparatuses 210, 220, 230, . . . 290.

The interface means used in the present exemplary embodiment include a physical connection means, for example, a serial communication channel, and a logical connection means, for example, inserting information into a watermark that conceals information in data itself or an inactive region of a video signal.

Figure 3:
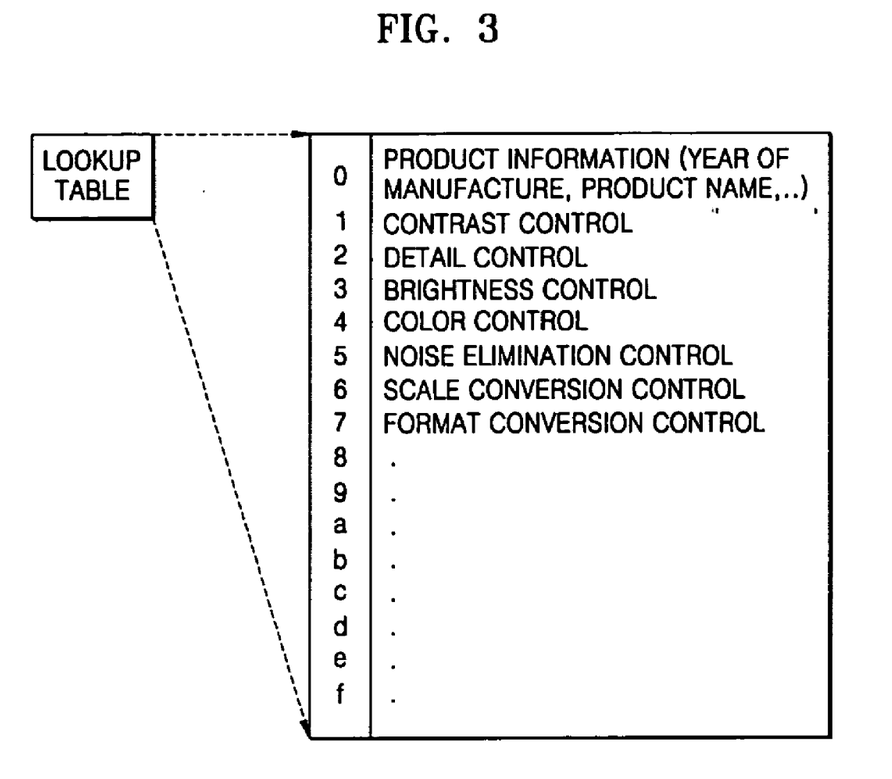
FIG. 3 illustrates a lookup table included in one of the data processing apparatuses illustrated in FIG. 2.

FIG. 3 illustrates one of the lookup tables 216, 226, 236, . . . 296. Referring to FIG. 3, the lookup table includes product information, such as a year of manufacture, a product version and a product name, of the corresponding one of the data processing units 212, 222, 232, . . . 292.

In addition, the lookup table includes information regarding items used for image quality enhancement by a corresponding data processing unit. For example, the items may be information regarding contrast control, detail control, brightness control, color control, noise elimination control, scale conversion control, and format conversion control. The lookup table also includes information regarding an algorithm for processing signals using the items and information regarding parameters set in the algorithm.

The lookup table shown in FIG. 3 is just an exemplary embodiment of the present invention. Lookup tables according to various exemplary embodiments of the present invention, which include other unmentioned items for image quality enhancement, may also be used.

Further, when input data includes voice data or other types of data, the lookup table can include an algorithm for processing such data, for example, in the case of voice data, information regarding parameters set in graceful degradation technology for preventing degradation of voice quality. Alternatively, the lookup table may include information for synchronizing image data with voice data.

Since data of each address in the lookup table shown in FIG. 3 is coded, the data is decoded by the corresponding one of the control units 214, 224, 234, ... 294.

Figure 4A:
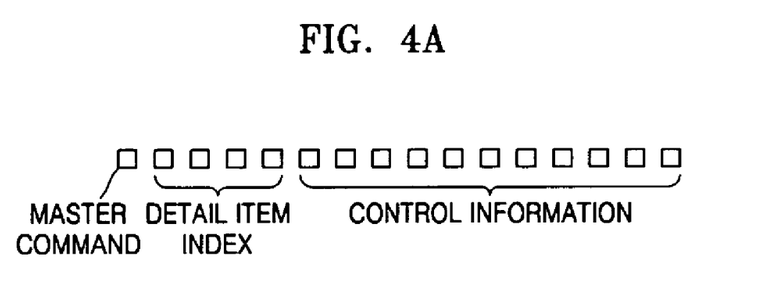
FIGS. 4A and 4B illustrate data configurations of items in the lookup table illustrated in FIG. 3 according to exemplary embodiments of the present invention.

FIG. 4A illustrates the data configuration for the items stored in the lookup table of FIG. 3 according to an exemplary embodiment of the present invention. In the present exemplary embodiment, 16 bits of data are used for the item, and a first bit indicates whether the item is controlled by a master command. For example, if a value of the first bit is "0", a set value of the item is maintained constant since the master command is not received. If the value of the first bit is "1", the processing of the item is controlled by the master command.

Second through fifth bits indicate item indexes. For example, if values of the second through fifth bits are "0000", the item is product information; if the values of the second through fifth bits are "0001", the item is contrast enhancement; if the values of the second through fifth bits are "0010", the item is detail enhancement; if the values of the second through fifth bits are "0011", the item is brightness enhancement; if the values of the second through fifth bits are "0101", the item is color enhancement; if the values of the second through fifth bits are "0110", the item is noise elimination; if the values of the second through fifth bits are "0111", the item is scale conversion; and if the values of the second through fifth bits are "1000", the item is format conversion.

Sixth through sixteenth bits indicate control information of the item. For example, if the value of the first bit is "0" and the values of the second through fifth bits are "0001", the second through sixteenth bits indicate an intensity value currently set within a predetermined range (e.g., 1 through 100) of intensity values for contrast adjustment.

In the present exemplary embodiment, the item for product information has a data configuration identical to items for other data processing. Alternatively, an address in the lookup table, for example, a first address, may indicate product information differently from the data configuration described above.

Figure 4B:
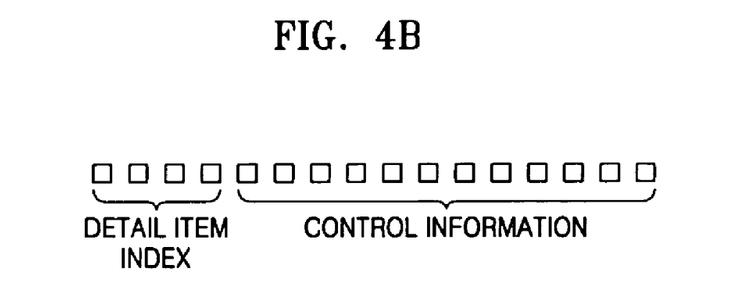

FIG. 4B illustrates the data configuration of one of the items in the lookup table of FIG. 3 according to another exemplary embodiment of the present invention. In the present exemplary embodiment, 16 bits of data are used for the item, and first through fourth bits indicate item indexes. The functions of the first through fourth bits are identical to those of the second through fifth bits of FIG. 4A, and thus their detailed descriptions will be omitted. In addition, fifth through sixteenth bits indicate control information of a detail item. The functions of the fifth through sixteenth bits are identical to those of the sixth through sixteenth bits of FIG. 4A, and thus their detailed descriptions will be omitted.

Figure 5:
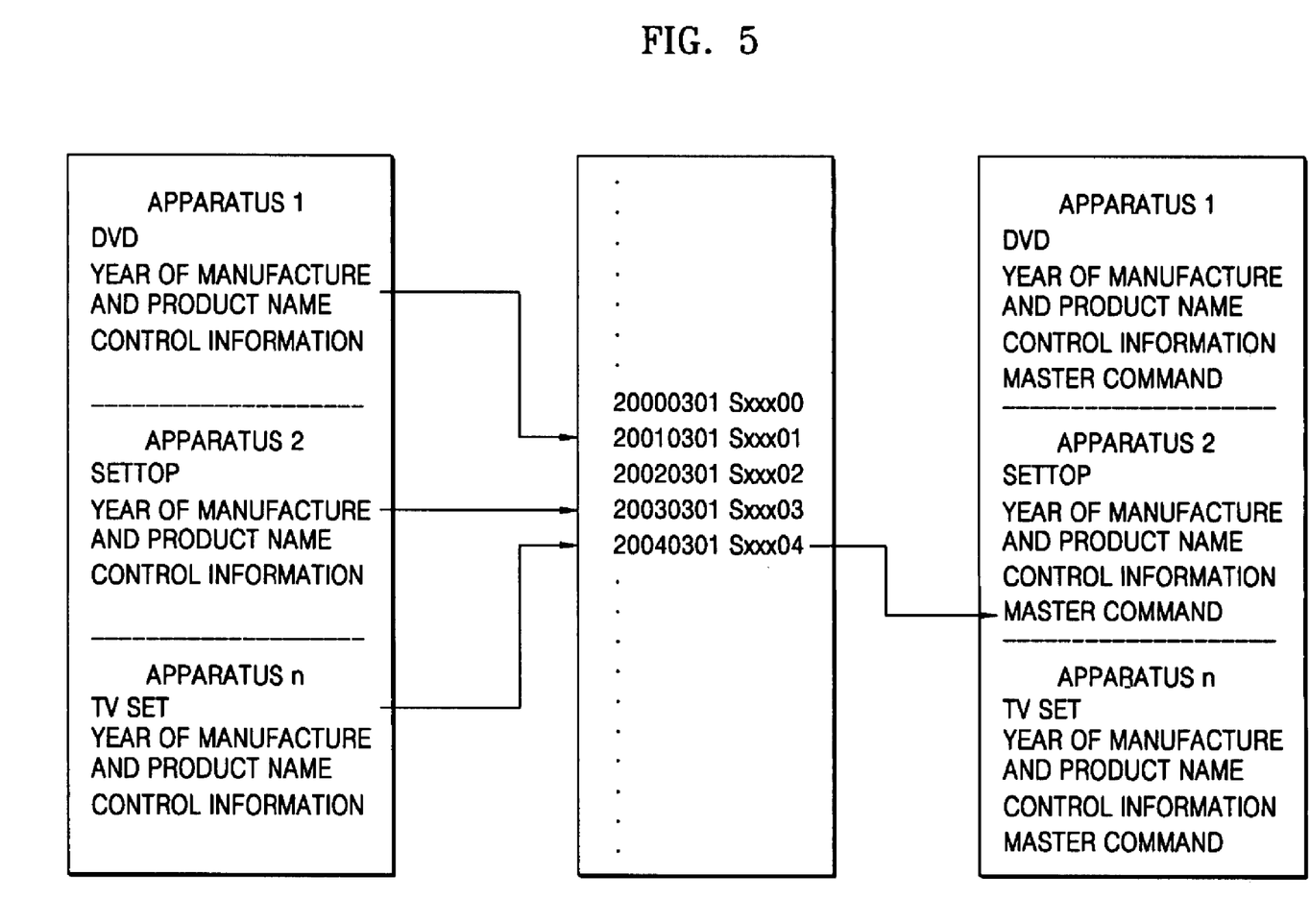
FIG. 5 illustrates a mode table according to an exemplary embodiment of the present invention.

FIG. 5 illustrates a mode table classified by year of manufacture and manufacturer's number of the data processing units. One of the control units 214, 224, 234, ... 294 included in the first through $n^{th}$ data processing apparatuses 210, 220, 230, ... 290 of FIG. 2 is set as a master control unit, and the remaining control units are set as slave control units. Referring to FIG. 5, the master control unit selects an optimum data processing unit with reference to product information and a mode table stored in one of the lookup tables 216, 226, 236, ... 296 in the first through $n^{th}$ data processing apparatuses 210, 220, 230, ... 290.

Referring to FIG. 5, the data processing unit of the first data processing apparatus, i.e., a DVD player, was manufactured on Mar. 1, 2001. The data processing unit of the second data processing apparatus, i.e., a set-top box, was manufactured on Mar. 1, 2003. The data processing unit of the $n^{th}$ image processing apparatus, i.e., a TV set, was manufactured on Mar. 1, 2004.

Since the data processing unit of the $n^{th}$ data processing apparatus 290, i.e., the TV set, is the newest data processing unit, data processing performed by the data processing unit of the first data processing apparatus, i.e., the DVD player, and the data processing unit of the second data processing apparatus, i.e., the set-top box, are based on default values, and the data processing unit of the $n^{th}$ data processing apparatus, i.e., the TV set, is set as a main data processing unit.

In other words, the master control unit transmits a master command to the control units of the first and second data processing apparatuses such that the data processing units process data based on default values. Alternatively, the master control unit can transmit control information including a set value of each item needed to control data processing as well as the master command. The master control unit transmits the master command to the control unit of the $n^{th}$ data processing apparatus such that the data processing unit can perform the main processing of data. The master control unit can also transmit control information including a set value for each item needed to control data processing to the control unit of the $n^{th}$ data processing apparatus, together with the master command.

The control units included in the first through $n^{th}$ data processing apparatuses respectively control data processing of the data processing units based on the master command received from the master control unit.

Alternatively, if one of the data processing units is selected as an optimum data processing unit, only the selected data processing unit may be set to process data in response to an input signal and the remaining data processing units may be set to skip data processing.

FIG. 5 illustrates a mode table classified by year of manufacture and manufacturer's number of the data processing units. However, a mode table classified by the functions of the data processing units or a mode table classified by data processing apparatus may also be used. For example, if it is desirable for the DVD, i.e., the first data processing apparatus, to perform a function for eliminating noise, the mode table can be created such that the data processing unit of the DVD processes data to eliminate noise.

An exemplary embodiment of the present invention will now be described with reference to FIGS. 2 through 5. In the present exemplary embodiment, among the first through $n^{th}$ data processing apparatuses 210, 220, 230, ... 290 illustrated in FIG. 2, the $n^{th}$ data processing apparatus 290 is set as a master apparatus. Accordingly, the control unit 294 of the $n^{th}$ data processing apparatus 290 is the master control unit and the first through $(n-1)^{th}$ data processing apparatuses 210, 220, 230, ... operate as slave control units.

The master control unit, i.e., the control unit 294 of the $n^{th}$ data processing apparatus 290, selects an optimum data processing unit or a combination of data processing units for processing input data with reference to information regarding detail items included in the lookup tables 216, 226, 236, ... 296 and a mode table (not shown) stored in a predetermined section of the master apparatus. The master control unit generates a master command including the information indicating the optimum data processing unit or a combination of data processing units and transmits the master command to each of the slave control units.

In the present exemplary embodiment, the mode table is stored in the predetermined section of the master apparatus. Also, mode tables stored in the slave apparatuses may be used. The slave control units receive the master command and control the operations of their respective data processing units based on the master command.

For example, if the data processing unit 222 of the second data processing apparatus 220 is determined to be the optimum data processing unit, the master control unit transmits master commands to the first data processing apparatus 210 and the third through $n^{th}$ data processing apparatuses 230, . . . 290 such that the data processing units 212, 232, . . . 292 of the first data processing apparatus 210 and the third through $n^{th}$ data processing apparatuses 230, . . . 290 process data based on default values. The master control unit also transmits a master command to the second data processing apparatus 220 such that the data processing unit 222 performs the main processing of data.

Alternatively, the master control unit, i.e., the control unit 294 of the $n^{th}$ data processing apparatus 290, may transmit master commands to the first through $n^{th}$ data processing apparatuses 210, 220, 230, . . . 290 to perform specific functions on input data. For example, the master control unit can transmit different master commands to the first through $n^{th}$ data processing apparatuses 210, 220, 230, . . . 290 such that the data processing unit 212 of the first data processing apparatus 210 performs a function for eliminating noise, the data processing unit 222 of the second data processing apparatus 220 performs a function for a format conversion, and the data processing unit of the $n^{th}$ data processing apparatus 290 performs a function for enhancing contrast.

A user may select a master apparatus from a plurality of data processing apparatuses. Alternatively, a manufacturer of the data processing apparatuses may determine a default master apparatus according to a predetermined standard. For example, among a plurality of data processing apparatuses, a display device which processes data temporally last or an AV receiver may be set as a default master apparatus.

When one of a plurality of data processing apparatuses operates as a master apparatus and the remaining data processing apparatuses operate as slave apparatuses, the master apparatus and the slave apparatuses may share their respective attribute information stored respectively in each memory of the master apparatus and the slave apparatuses to carry out optimum data processing.

For example, if a manufacturer tests diverse data processing apparatuses in advance and stores information regarding an optimum combination of data processing apparatuses, which can provide the best results, in a predetermined memory region, data processing may be performed based on the stored information regarding the optimum combination of data processing apparatuses.

Also, data processing apparatuses in a network may share their attribute information and determine a data processing apparatus or a combination of data processing apparatuses, which can bring the best result, based on a predetermined standard. In this case, data processing may be carried out by the determined data processing apparatus or the determined combination of data processing apparatuses.

A standard for determining an optimum data processing apparatus or an optimum combination of data processing apparatuses may be an objective standard and a subjective standard.

An example of the objective standard is Peak Signal-to-Noise Ratio (PSNR). If the objective standard is used, a plurality of data processing apparatuses determines an optimum data processing unit or an optimum combination of data processing units based on the PSNR.

Table 1 shows an example of signal processing quality using the objective standard. Referring to Table 1, the master apparatus processes a predetermined input signal in a plurality of modes, and calculates a PSNR value for each mode.

TABLE 1

|  | DVD | Set-top | TV Set | PSNR |
|---|---|---|---|---|
| Mode 1 | Noise elimination | Format conversion | Contrast | 30 dB |
| Mode 2 | Format conversion | Noise elimination | Contrast | 25 dB |
| Mode 3 | Format conversion | Contrast | Noise elimination | 20 dB |
| . . . | . . . | . . . | . . . | 10 dB |
| . . . | . . . | . . . | . . . | 5 dB |

In this case, an optimum mode is mode 1, which has the highest PSNR value. Accordingly, the data processing apparatuses process the input signal for noise elimination, format conversion, contrast enhancement, and the like. For example, a DVD eliminates noise, a TV set enhances contrast, and a Set-top box converts a format.

An optimum data processing unit or an optimum combination of data processing units may be determined according to the subjective standard. In this case, a predetermined input signal may be processed in a plurality of predetermined modes, and a user may select an optimum data processing unit or an optimum combination of data processing units, based on the result of the data processing.

If the master apparatus and some of the slave apparatuses are manufactured by different manufacturers and the master apparatus cannot obtain information regarding all of the slave apparatuses, the master apparatus cannot render any judgment on the slave apparatuses which do not provide information. Thus, the master apparatus determines that such slave apparatuses do not process data and determines an optimum data processing unit or an optimum combination of data processing units from only those slave apparatuses that share information with the master apparatus. Then, data is processed by the determined data processing unit or the determined combination of data processing units.

If the master apparatus and some of the slave apparatuses are manufactured by different manufacturers but the slave apparatuses can provide information that the master apparatus can recognize, the master apparatus determines the optimum data processing unit or the optimum combination of data processing units in consideration of all slave apparatuses which provide information that the master apparatus can recognize. Then, the data is processed by the determined optimum data processing unit or the determined optimum combination of data processing units.

Figure 6:
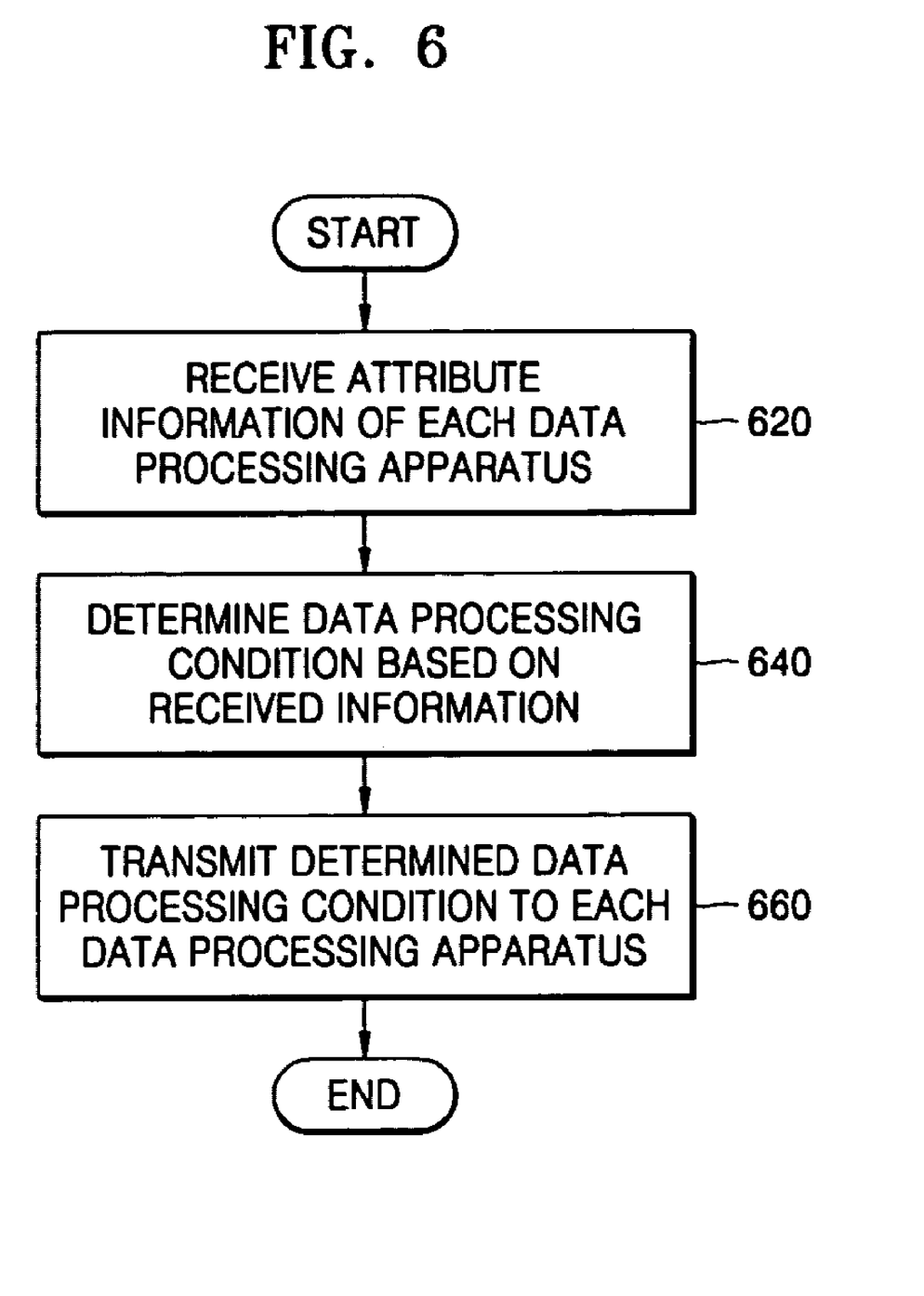
FIG. 6 is a flowchart illustrating a data processing method of a master apparatus according to an exemplary embodiment of the present invention.

FIG. 6 is a flowchart illustrating a data processing method performed by the master apparatus according to an exemplary embodiment of the present invention. The method will now be described with reference to FIGS. 2 through 6.

In operation 620, the master control unit, i.e., the control unit 294 of the $n^{th}$ data processing apparatus 290, which is predetermined as the master apparatus, receives attribute information of at least one of the data processing units 212, 222, 232, . . . of the first through $(n-1)^{th}$ data processing apparatuses 210, 220, 230, . . . from at least one of the first through $(n-1)^{th}$ data processing apparatuses 210, 220, 230, . . . , i.e., slave apparatuses. In this case, the data processing units 212, 222, 232, . . . may or may not be manufactured by the same manufacturer, or information regarding the data processing units 212, 222, 232, . . . can be recognized by the master apparatus.

In operation 640, the master control unit sets a condition for processing input data based on the attribute information of the data processing units 212, 222, 232, . . . . The data processing condition may be determined based on the attribute information of the data processing units 212, 222, 232, . . . and the mode table illustrated in FIG. 5.

For example, if the mode table is classified by year of manufacture or product version, the newest one of the data processing units 212, 222, 232, . . . is set to process the input data. Alternatively, each of the data processing units 212, 222, 232, . . . may be set to perform a specific data processing function.

In operation 660, the mater control unit, i.e., the control unit 294 of the $n^{th}$ data processing apparatus 290, generates the data processing condition determined in operation 640 as a master command and transmits the master command to each of the slave apparatuses.

Figure 7:
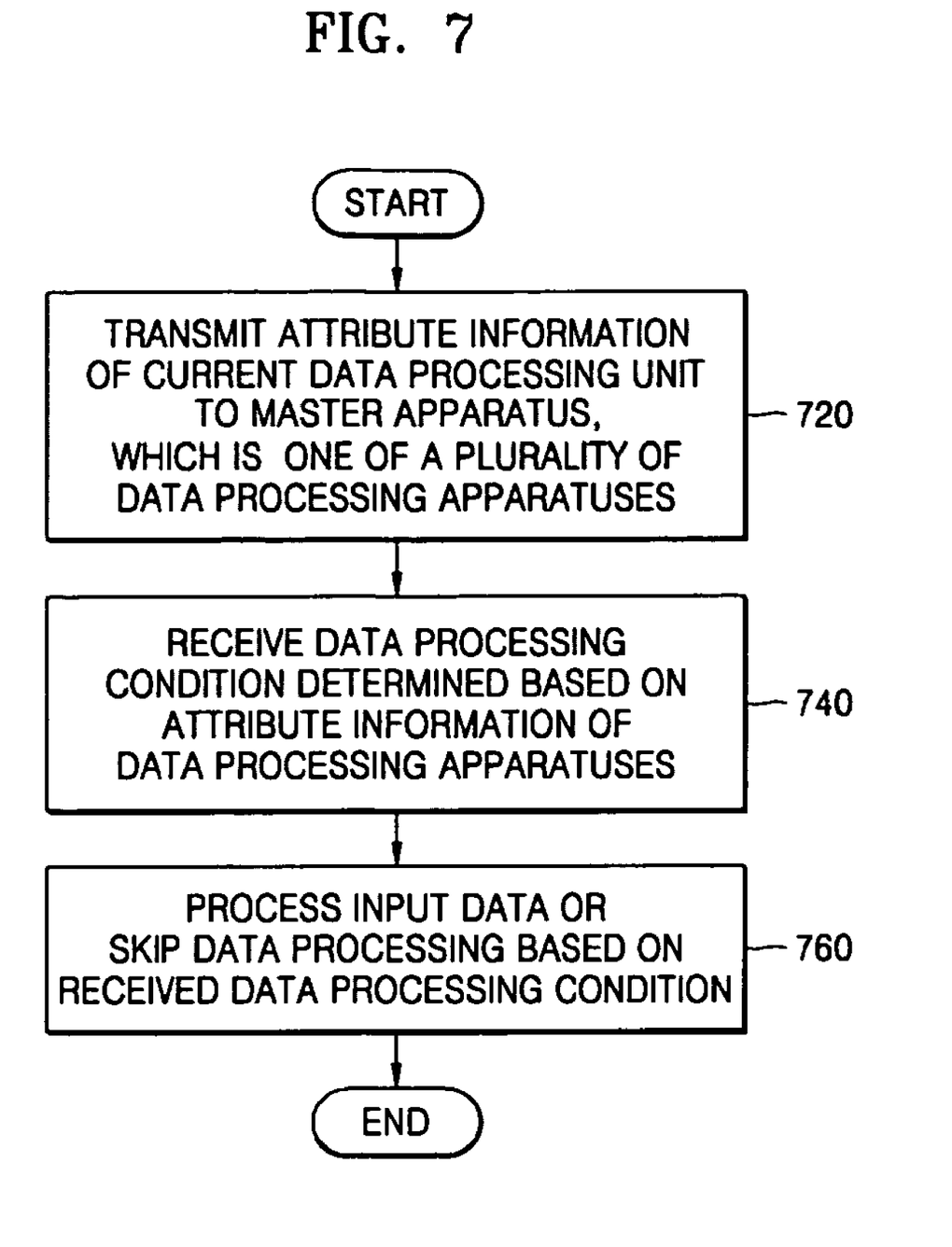
FIG. 7 is a flowchart illustrating a data processing method of a slave apparatus according to an exemplary embodiment of the present invention.

FIG. 7 is a flowchart illustrating a data processing method performed by one of the slave apparatuses according to an exemplary embodiment of the present invention. The method will now be described with reference to FIGS. 2 through 5.

In operation 720, the control unit 214 of the first data processing apparatus 210, which is determined to be one of the slave apparatuses, transmits attribute information of the data processing unit 212 to the master control unit, i.e., the control unit 294 of the $n^{th}$ data processing unit 290, which is predetermined to be the master apparatus, via a bi-directional interface.

In operation 740, the data control unit 214 of the first data processing apparatus 210 receives the master command containing information regarding the data processing condition determined based on the attribute information of the data processing units 212, 222, 232, . . . .

In operation 760, the data processing unit 212 performs or skips the processing of input data based on the data processing condition received in operation 740. Alternatively, parameters of the data processing unit 212 may be set based on the received information regarding the data processing condition.

Figure 8:
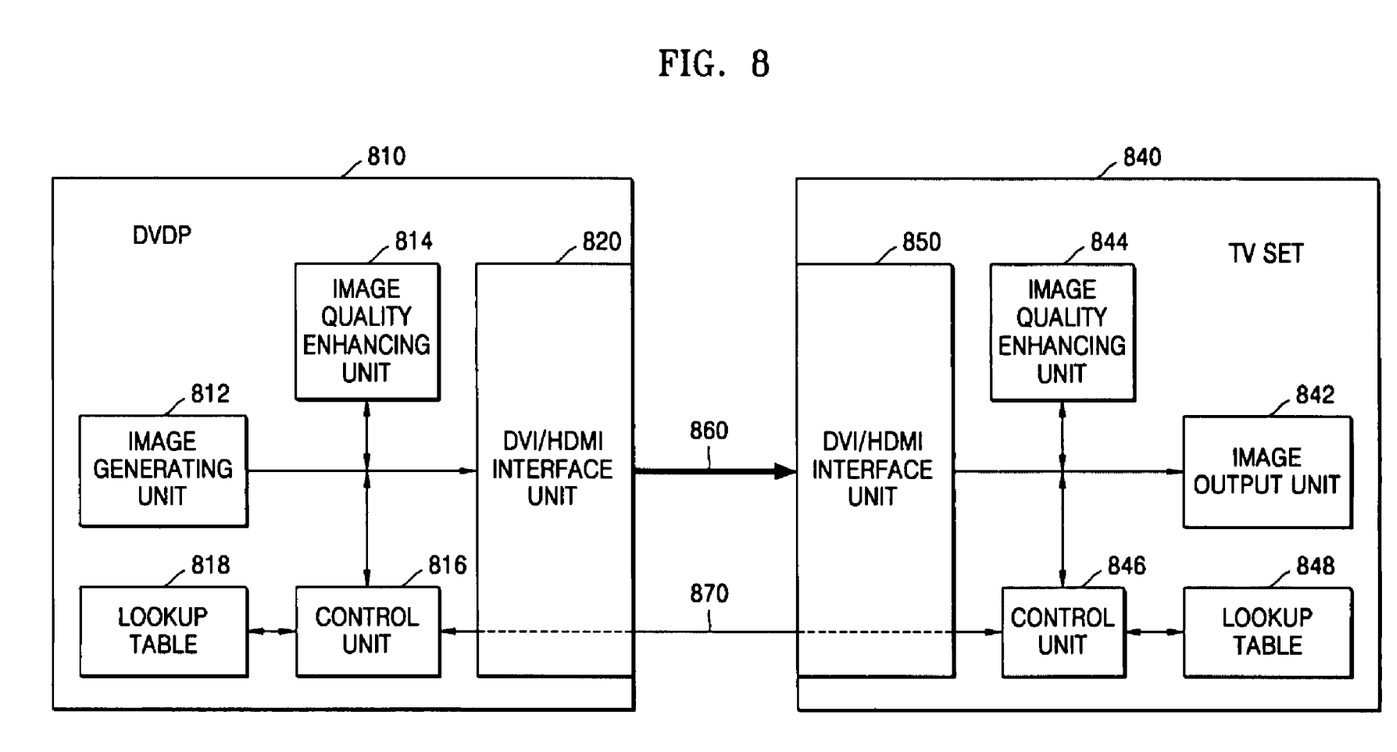
FIG. 8 is a block diagram for illustrating a data processing method according to an exemplary embodiment of the present invention.

FIG. 8 is a block diagram for illustrating a data processing method according to the present invention. In FIG. 8, an input signal contains video data and data processing apparatuses are a DVDP 810 and a TV set 840, which include image quality enhancing units 814 and 844, respectively.

A method of enhancing image quality when the image quality enhancing units 814 and 844 of the DVDP 810 and the TV set 840 are manufactured by the same manufacturer, or the DVDP 810 and the TV set 840 can share attribute information of their respective image quality enhancing units 814 and 844 will now be described with reference to FIG. 8.

In the present exemplary embodiment, the image quality enhancing units 814 and 844 of the DVDP 810 and the TV set 840 are considered. However, the identical data processing method may also be applied to an audio processing unit.

Referring to FIG. 8, the DVDP 810 includes an image generating unit 812, the image quality enhancing unit 814, a control unit 816, a lookup table 818, and an interface unit 820. In addition, the TV set 840 includes an image output unit 842, the image quality enhancing unit 844, a control unit 846, a lookup table 848, and an interface unit 850. In the present exemplary embodiment, the control unit 846 of the TV set 840 is set as a master control unit by a user.

By using an interface 870 providing bi-directional communication between the interface units 820 and 850, the control unit 846 set as the master control unit determines an optimum condition for enhancing image quality based on attribute information of the image quality enhancing unit 814 stored in the lookup table 818 of the DVDP 810, such as a manufacturer, a year of manufacture, a product version, information regarding detail image quality enhancement and so on, and attribute information of the image quality enhancing unit 844 stored in the lookup table 848 of the TV set 840, such as a manufacturer, a year of manufacture, a product version, information regarding detail image quality enhancement and so on. In the present exemplary embodiment, the interface units 820 and 850 use digital video interactive (DVI)/high definition multimedia interface (HDMI).

In an exemplary embodiment of the present invention, only one of the image quality enhancing units 814 and 844 is selected in consideration of a year of manufacture and a product version, and the selected image quality enhancing unit 814 or 844 processes input data to enhance image quality. For example, if the image quality enhancing unit 844 of the TV set 840 is newer than the image quality enhancing unit 814 of the DVDP 810, the master control unit, i.e., the control unit 846 of the TV set 840, transmits a master command to the image quality enhancing unit 814 of the DVDP 810 instructing the image quality enhancing unit 814 not to process the input data to enhance image quality. The master control unit transmits a master command to the image quality enhancing unit 844 of the TV set 840 instructing the image quality enhancing unit 814 to process the input data to enhance image quality.

Image data generated by the image generating unit 812 of the DVDP 810 is transmitted to the TV set 840 via the interface unit 820 and an interface 860 without being processed by the image quality enhancing unit 814, which is controlled by the control unit 816. The image data transmitted to the TV set 840 is processed by the image quality enhancing unit 844, which is controlled by the control unit 846, to enhance image quality and transmitted to the image output unit 842.

In another exemplary embodiment of the present invention, the image quality enhancing units 814 and 844 may perform different processes on the input image data. For example, the image quality enhancing unit 814 of the DVDP 810 may eliminate noise and convert a format of the input image data, and the image quality enhancing unit 844 of the TV set 840 may enhance contrast. In this case, the master control unit transmits a master command to each of the DVDP 810 and the TV set 840 such that the image quality enhancing units 814 and 844 perform the different processes on the image data to enhance image quality.

Therefore, controlled by the control unit 816, the image quality enhancing unit 814 of the DVDP 810 eliminates noise from and converts the format of image data generated by the image generating unit 812 but does not enhance the contrast of the image data. The image data, which the process noise for elimination and format conversion is performed, is transmitted to the TV set 840 via the interface. Controlled by the control unit 846, the image quality enhancing unit 844 of the TV set 840 does not remove noise from or convert the format of the image data but enhances the contrast of the image data. Then, the image data with enhanced contrast is transmitted to the image output unit 842.

The TV set 810 of FIG. 8, such as a digital TV, performs diverse image quality enhancement functions. However, image quality enhancement is not a primary goal of an apparatus such as a DVDP or a settop box which is connected to a TV set and inputs images to the TV set. Therefore, such an apparatus did not have a function for image quality enhancement, or otherwise only included a low-performance image quality enhancing unit.

However, as technology has developed and customer needs have become more sophisticated, a high-performance image quality enhancing unit has been added to an image input apparatus such as a DVDP. For example, image quality enhancing units of the same version manufactured by the same manufacturer or different versions of a image quality enhancing unit manufactured by the same manufacturer may be installed in TV sets and DVDPs that input images to the TV sets.

In this case, the process of enhancing image quality is redundantly performed, thereby distorting image quality as described above. However, the present invention can prevent the redundant image quality enhancement processes. In addition, different image quality enhancement processes performed by image devices can be combined to perform an optimum image quality enhancement process.

As described above, according to the present invention, an optimum data processing apparatus or an optimum combination of data processing apparatuses can be selected to optimally process input data by allowing a plurality of data processing apparatuses to share attribute information among themselves. In addition, when image devices performing a series of data processing include at least image quality enhancing units and/or audio processing units, the present invention can prevent redundant image quality enhancement processes. Also, image quality and/or enhancement processes among data processing apparatuses can be combined to perform an optimum image quality and/or enhancement process.

The present invention can also be implemented as a computer-readable program on a computer-readable recording medium. Codes and code segments constituting the computer-readable program can be easily construed by programmers skilled in the art to which the present invention pertains. Also, the computer-readable program can be stored in a computer-readable recording medium, and be read and executed by a computer system to accomplish the present invention. Examples of the computer-readable recording medium include magnetic tapes, optical data storage devices, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data processing method using a plurality of data processing apparatuses, the data processing method comprising:
   receiving respective attribute information of at least one of the data processing apparatuses;
   selecting at least one of the data processing apparatuses to process input data, based on the respective attribute information;
   determining a data processing condition for processing the input data at the selected at least one of the data processing apparatuses, based on the respective attribute information; and
   transmitting a control signal including the data processing condition to the selected at least one of the data processing apparatuses or the data processing apparatuses,
   wherein the control signal indicates that the selected at least one of the data processing apparatuses is to process the input data under the data processing condition, and remaining data processing apparatuses among the data processing apparatuses are to process the input data under a different data processing condition.

2. The method of claim 1, wherein the input data is image data and the data processing apparatuses are image quality enhancing units which enhance image quality of the image data by changing values with respect to at least one characteristic defining quality of the input data.

3. The method of claim 1, wherein the input data is audio data, and the data processing apparatuses are audio processing units which enhance audio quality of the audio data by changing values with respect to at least one characteristic defining quality of the input data.

4. The method of claim 1, wherein the data processing apparatuses exchange the respective attribute information and data processing conditions via respective bi-directional interfaces.

5. The method of claim 1, wherein the respective attribute information of the at least one of the data processing apparatuses comprises at least one of a manufacturer, a year of manufacture, and a product version of the at least one of the data processing apparatuses.

6. The method of claim 1, wherein the respective attribute information of the at least one of the data processing apparatuses is set to control at least one of contrast enhancement, detail enhancement, brightness enhancement, color enhancement, noise elimination, scale conversion, and format conversion.

7. The method of claim 6, wherein the one of contrast enhancement, detail enhancement, brightness enhancement, color enhancement, noise elimination, scale conversion, and format conversion is controlled using an algorithm and parameters set in the algorithm.

8. The method of claim 1, wherein the control signal comprises information indicating respective data processing conditions for processing the input data for each of the data processing apparatuses.

9. The method of claim 1, wherein the respective attribute information of the at least one of the data processing apparatuses comprises at least one of a year of manufacture and a product version of the at least one of the data processing apparatuses, and the selecting the at least one of the data processing apparatuses comprises selecting a newest one among the data processing apparatuses as an apparatus to process the input data, based on the respective attribute information.

10. The method of claim 1, wherein the different data processing condition indicates that the remaining data processing apparatuses use set default values in the processing the input data, or the remaining data processing apparatuses do not process the input data.

11. An apparatus for processing input data in association with a plurality of data processing apparatuses, the apparatus comprising:
   an input unit which receives respective attribute information of at least one of the data processing apparatuses;
   a selection unit which selects at least one of the data processing apparatuses to process the input data, based on the respective attribute information;
   a determining unit which determines a data processing condition for processing the input data at the selected at least one of the data processing apparatuses, based on the respective attribute information; and
   a transmitting unit which transmits a control signal including the data processing condition to the selected at least one of the data processing apparatuses or the data processing apparatuses,
   wherein the control signal indicates that the selected at least one of the data processing apparatuses is to process the input data under the data processing condition, and remaining data processing apparatuses among the data processing apparatuses are to process the input data under a different data processing condition.

12. The apparatus of claim 11, wherein the input data is image data and the data processing apparatuses are image quality enhancing units which enhance image quality of the image data by changing values with respect to at least one characteristic defining quality of the input data.

13. The apparatus of claim 11, wherein the input data is audio data, and the data processing apparatuses are audio processing units which enhance audio quality of the audio data by changing values with respect to at least one characteristic defining quality of the input data.

14. The apparatus of claim 11, wherein the respective attribute information of the at least one of the data processing apparatuses comprises at least one of a manufacturer, a year of manufacture, and a product version of the at least one of the data processing apparatuses.

15. The apparatus of claim 11, wherein the respective attribute information of the at least one of the data processing apparatuses is set to control at least one of contrast enhancement, detail enhancement, brightness enhancement, color enhancement, noise elimination, scale conversion, and format conversion.

16. The apparatus of claim 15, wherein the one of contrast enhancement, detail enhancement, brightness enhancement, color enhancement, noise elimination, scale conversion, and format conversion is controlled using an algorithm and parameters set in the algorithm.

17. The apparatus of claim 11, wherein the control signal comprises information indicating respective data processing conditions for processing the input data with respect to the at least one characteristic for each of the data processing apparatuses.

18. The apparatus of claim 11, wherein the respective attribute information of the at least one of the data processing apparatuses comprises at least one of a year of manufacture and a product version of the at least one of the data processing apparatuses, and the selection unit selects a newest one among the data processing apparatuses as an apparatus to process the input data, based on the respective attribute information.

19. The apparatus of claim 11, wherein the different data processing condition indicates that the remaining data processing apparatuses use set default values in the processing the input data, or the remaining data processing apparatuses do not process the input data.

20. A data processing method using a plurality of data processing apparatuses having respective data processing units for processing input data with respect to at least one characteristic defining quality of the input data, the respective data processing units being functionally redundant to each other in the processing the input data with respect to one of the at least one characteristic, one of the data processing apparatuses being a master apparatus, the data processing method comprising:
transmitting attribute information of a current data processing apparatus, among the plurality of data processing apparatuses, to the master apparatus;
receiving, from the master apparatus, a control signal including data processing condition for processing the input data with respect to the one characteristic determined according to respective attribute information of at least one of the data processing apparatuses; and
processing the input data based on the data processing condition with respect to the one characteristic at the current data processing apparatus,
wherein the control signal indicates that remaining data processing apparatuses among the data processing apparatuses are to process the input data with respect to the one characteristic under a different data processing condition.

21. The method of claim 20, wherein the input data is image data and the respective data processing units are image quality enhancing units which enhance image quality of the image data by changing values with respect to the at least one characteristic.

22. The method of claim 20, wherein the input data is audio data, and the respective data processing units are audio processing units which enhance audio quality of the audio data by changing values with respect to the at least one characteristic.

23. The method of claim 20, wherein the data processing apparatuses exchange the respective attribute information and data processing condition information via respective bi-directional interfaces.

24. The method of claim 20, wherein the respective attribute information of the at least one of the data processing apparatuses comprises at least one of a manufacturer, a year of manufacture, and a product version of the at least one of the data processing apparatuses, and
wherein the at least one characteristic comprises contrast enhancement, detail enhancement, brightness enhancement, color enhancement, noise elimination, scale conversion, and format conversion.

25. The method of claim 20, wherein the respective attribute information of the at least one of the data processing apparatuses is set to control at least one of contrast enhancement, detail enhancement, brightness enhancement, color enhancement, noise elimination, scale conversion, and format conversion, and
wherein the at least one characteristic comprises the contrast enhancement, the detail enhancement, the brightness enhancement, the color enhancement, the noise elimination, the scale conversion, and the format conversion.

26. The method of claim 25, wherein the one of contrast enhancement, detail enhancement, brightness enhancement, color enhancement, noise elimination, scale conversion, and format conversion is controlled using an algorithm and parameters set in the algorithm.

27. The method of claim 20, wherein the respective attribute information of the at least one of the data processing apparatuses comprises at least one of a year of manufacture and a product version of the at least one of the data processing apparatuses, and the current data processing apparatus is a newest one among the data processing apparatuses for processing the input data with respect to the one characteristic, based on the respective attribute information.

28. The method of claim 20, wherein the different data processing condition indicates that the remaining data processing apparatuses use set default values in the processing the input data, or the remaining data processing apparatuses do not process the input data.

29. An apparatus for processing input data in association with a plurality of data processing apparatuses having respective data processing units for processing input data with respect to at least one characteristic defining quality of the input data, the respective data processing units being functionally redundant to each other in the processing the input data with respect to one of the at least one characteristic, one of the data processing apparatuses being a master apparatus, the apparatus comprising:
a transmitting unit which transmits attribute information of the apparatus to the master apparatus;
an input unit which receives, from the master apparatus, a control signal including data processing condition for processing the input data with respect to the one characteristic determined according to respective attribute information of at least one of the data processing apparatuses; and a data processing unit which processes the input data based on the data processing condition, wherein the control signal indicates that remaining data processing apparatuses among the data processing apparatuses are to process the input data with respect to the one characteristic under a different data processing condition.

30. The apparatus of claim 29, wherein the input data is image data and the respective data processing units are image quality enhancing units which enhance image quality of the image data by changing values with respect to the at least one characteristic.

31. The apparatus of claim 29, wherein the input data is audio data, and the respective data processing units are audio processing units which enhance audio quality of the audio data by changing values with respect to the at least one characteristic.

32. The apparatus of claim 29, wherein the respective attribute information of the at least one of the data processing apparatuses comprises at least one of a manufacturer, a year of manufacture, and a product version of the at least one of the data processing apparatuses, and wherein the at least one characteristic comprises contrast enhancement, detail enhancement, brightness enhancement, color enhancement, noise elimination, scale conversion, and format conversion.

33. The apparatus of claim 29, wherein the respective attribute information of the at least one of the data processing apparatuses is set to control at least one of contrast enhancement, detail enhancement, brightness enhancement, color enhancement, noise elimination, scale conversion, and format conversion, and wherein the at least one characteristic comprises the contrast enhancement, the detail enhancement, the brightness enhancement, the color enhancement, the noise elimination, the scale conversion, and the format conversion.

34. The apparatus of claim 33, wherein the one of contrast enhancement, detail enhancement, brightness enhancement, color enhancement, noise elimination, scale conversion, and format conversion is controlled using an algorithm and parameters set in the algorithm.

35. The apparatus of claim 29, wherein the control signal comprises information indicating respective data processing conditions for processing the input data with respect to the at least one characteristic for each of the data processing apparatuses.

36. The apparatus of claim 29, wherein the respective attribute information of the at least one of the data processing apparatuses comprises at least one of a year of manufacture and a product version of the at least one of the data processing apparatuses, and the apparatus is a newest one among the data processing apparatuses as an apparatus to process the input data with respect to the one characteristic, based on the respective attribute information.

37. The apparatus of claim 29, wherein the different data processing condition indicates that the remaining data processing apparatuses use set default values in the processing the input data, or the remaining data processing apparatuses do not process the input data.

38. A computer-readable storage medium storing a program for executing a data processing method using a plurality of data processing apparatuses, the data processing method comprising:

receiving respective attribute information of at least one of the data processing apparatuses;

selecting at least one of the data processing apparatuses to process input data, based on the respective attribute information;

determining a data processing condition for processing the input data at the selected at least one of the data processing apparatuses, based on the respective attribute information; and transmitting a control signal including the data processing condition to the selected at least one of the data processing apparatuses or the data processing apparatuses, wherein the control signal indicates that the selected at least one of the data processing apparatuses is to process the input data under the data processing condition, and remaining data processing apparatuses among the data processing apparatuses are to process the input data under a different data processing condition.

39. The medium of claim 38, wherein the input data is image data and the data processing apparatuses are image quality enhancing units which enhance image quality of the image data by changing values with respect to at least one characteristic defining quality of the input data.

40. The medium of claim 38, wherein the input data is audio data, and the data processing apparatuses are audio processing units which enhance audio quality of the audio data by changing values with respect to at least one characteristic defining quality of the input data.

41. The medium of claim 38, wherein the respective attribute information of the at least one of the data processing apparatuses comprises at least one of a manufacturer, a year of manufacture, and a product version of the at least one of the data processing apparatuses.

42. The medium of claim 38, wherein the respective attribute information of the at least one of the data processing apparatuses is set to control at least one of contrast enhancement, detail enhancement, brightness enhancement, color enhancement, noise elimination, scale conversion, and format conversion.

43. The medium of claim 38, wherein the different data processing condition indicates that the remaining data processing apparatuses use set default values in the processing the input data, or the remaining data processing apparatuses do not process the input data.

44. A computer-readable storage medium storing a program for executing a data processing method using a plurality of data processing apparatuses having respective data processing units for processing input data with respect to at least one characteristic defining quality of the input data, the respective data processing units being functionally redundant to each other in the processing the input data with respect to one of the at least one characteristic, one of the data processing apparatuses being a master apparatus, the data processing method comprising:

transmitting attribute information of a current data processing apparatus, among the plurality of data processing apparatuses, to the master apparatus;

receiving, from the master apparatus, a control signal including data processing condition for processing the input data with respect to the one characteristic determined according to respective attribute information of at least one of the data processing apparatuses; and processing the input data based on the data processing condition with respect to the one characteristic at the current data processing apparatus, wherein the control signal indicates that remaining data processing apparatuses among the data processing apparatuses are to process the input data with respect to the one characteristic under a different data processing condition.

45. The medium of claim 44, wherein the input data is image data and the respective data processing units are image quality enhancing units which enhance image quality of the image data by changing values with respect to the at least one characteristic.

46. The medium of claim 44, wherein the input data is audio data, and the respective data processing units are audio processing units which enhance audio quality of the audio data by changing values with respect to the at least one characteristic.

47. The medium of claim 44, wherein the respective attribute information of the at least one of the data processing apparatuses comprises at least one of a manufacturer, a year of manufacture, and a product version of the at least one of the data processing apparatuses, and
wherein the at least one characteristic comprises contrast enhancement, detail enhancement, brightness enhancement, color enhancement, noise elimination, scale conversion, and format conversion.

48. The medium of claim 44, wherein the respective attribute information of the at least one of the data processing apparatuses is set to control at least one of contrast enhancement, detail enhancement, brightness enhancement, color enhancement, noise elimination, scale conversion, and format conversion, and
wherein the at least one characteristic comprises the contrast enhancement, the detail enhancement, the brightness enhancement, the color enhancement, the noise elimination, the scale conversion, and the format conversion.

49. The medium of claim 44, wherein the respective attribute information of the at least one of the data processing apparatuses comprises at least one of a year of manufacture and a product version of the at least one of the data processing apparatuses, and the current data processing apparatus is a newest one among the data processing apparatuses for processing the input data with respect to the one characteristic, based on the respective attribute information.

50. The medium of claim 44, wherein the different data processing condition indicates that the remaining data processing apparatuses use set default values in the processing the input data, or the remaining data processing apparatuses do not process the input data.

51. The method of claim 1, wherein the data processing apparatuses comprise respective data processing units for processing the input data with respect to at least one characteristic defining quality of the input data, the respective data processing units being functionally redundant to each other in the processing the input data with respect to one of the at least one characteristic, the method further comprising:
selecting the remaining data processing apparatuses to process the input data with respect to the at least one characteristic except the one characteristic, respectively based on the respective attribute information; and
determining respective data processing conditions, based on the respective attribute information, for processing the input data with respect to the at least one characteristic except the one characteristic at the remaining data processing apparatuses,
wherein the control signal includes the respective data processing conditions and is transmitted to the data processing apparatuses so that the remaining data processing apparatuses process the input data according to the respective data processing conditions.

52. The apparatus of claim 11, wherein the data processing apparatuses comprise respective data processing units for processing the input data with respect to at least one characteristic defining quality of the input data, the respective data processing units being functionally redundant to each other in the processing the input data with respect to one of the at least one characteristic,
wherein the selection unit further selects the remaining data processing apparatuses to process the input data with respect to the at least one characteristic except the one characteristic, respectively based on the respective attribute information, and
wherein the determining unit determines respective data processing conditions, based on the respective attribute information, for processing the input data with respect to the at least one characteristic except the one characteristic at the remaining data processing apparatuses, and
wherein the control signal includes the respective data processing conditions and is transmitted to the data processing apparatuses so that the remaining data processing apparatuses process the input data according to the respective data processing conditions.

53. The medium of claim 38, wherein the data processing apparatuses comprise respective data processing units for processing the input data with respect to at least one characteristic defining quality of the input data, the respective data processing units being functionally redundant to each other in the processing the input data with respect to one of the at least one characteristic, the method further comprising:
wherein the selection unit further selects the remaining data processing apparatuses to process the input data with respect to the at least one characteristic except the one characteristic, respectively based on the respective attribute information, and
wherein the determining unit determines respective data processing conditions, based on the respective attribute information, for processing the input data with respect to the at least one characteristic except the one characteristic at the remaining data processing apparatuses, and
wherein the control signal includes the respective data processing conditions and is transmitted to the data processing apparatuses so that the remaining data processing apparatuses process the input data according to the respective data processing conditions.

* * * * *